(12) United States Patent
Li

(10) Patent No.: US 12,184,406 B2
(45) Date of Patent: Dec. 31, 2024

(54) METHOD AND APPARATUS FOR CONFIGURING SYNCHRONISATION INFORMATION, NETWORK DEVICE, AND STORAGE MEDIUM

(71) Applicant: ZTE Corporation, Shenzhen (CN)

(72) Inventor: Xin Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 431 days.

(21) Appl. No.: 17/622,765

(22) PCT Filed: Dec. 21, 2020

(86) PCT No.: PCT/CN2020/138107
§ 371 (c)(1),
(2) Date: Dec. 24, 2021

(87) PCT Pub. No.: WO2021/129578
PCT Pub. Date: Jul. 1, 2021

(65) Prior Publication Data
US 2022/0247505 A1 Aug. 4, 2022

(30) Foreign Application Priority Data
Dec. 23, 2019 (CN) .......................... 201911337974.8

(51) Int. Cl.
*H04J 3/06* (2006.01)
*H04W 56/00* (2009.01)
(52) U.S. Cl.
CPC .......... *H04J 3/0667* (2013.01); *H04J 3/0697* (2013.01); *H04W 56/001* (2013.01)

(58) Field of Classification Search
CPC ...... H04J 3/0667; H04J 3/0697; H04J 3/1658; H04W 56/001; H04W 56/0015
See application file for complete search history.

(56) References Cited

U.S. PATENT DOCUMENTS

| | | | | |
|---|---|---|---|---|
| 8,982,912 B2 * | 3/2015 | Fourcand | .............. | H04J 3/0602 370/504 |
| 2014/0146811 A1 * | 5/2014 | Wen | ...................... | H04J 3/0667 370/350 |

(Continued)

FOREIGN PATENT DOCUMENTS

| | | | | |
|---|---|---|---|---|
| AU | 2017437863 B2 * | 4/2023 | .............. | H04J 3/065 |
| CA | 3078834 A1 * | 4/2019 | .............. | H03M 9/00 |

(Continued)

OTHER PUBLICATIONS

Google Patents Translation of CN 108880722 A (Year: 2017).*
(Continued)

*Primary Examiner* — Chi H Pham
*Assistant Examiner* — Vladislav Y Agureyev
(74) *Attorney, Agent, or Firm* — Vivacqua Crane, PLLC

(57) ABSTRACT

Disclosed are a method and apparatus for configuring synchronization information, a network device and a storage medium. The method includes: starting detection of a predetermined synchronization message for a received Ethernet overhead frame in response to receiving a detection start instruction for the predetermined synchronization message; and, generating synchronization information corresponding to the predetermined synchronization message according to the detected predetermined synchronization message, and configuring the synchronization information to an Ethernet port of a local device.

20 Claims, 8 Drawing Sheets

FIG. 3b

(56) References Cited

U.S. PATENT DOCUMENTS

| | | | | |
|---|---|---|---|---|
| 2015/0350317 | A1* | 12/2015 | Gvillo | H04J 3/0638 709/248 |
| 2017/0063491 | A1* | 3/2017 | Bruckman | H04J 3/0658 |
| 2017/0093757 | A1* | 3/2017 | Gareau | H04J 3/065 |
| 2018/0123714 | A1* | 5/2018 | Zhong | H04L 1/0057 |
| 2018/0375800 | A1* | 12/2018 | Gareau | H04L 49/35 |
| 2019/0199505 | A1* | 6/2019 | Zhang | H04L 7/0008 |
| 2019/0342022 | A1* | 11/2019 | Zhou | H04J 3/0632 |
| 2019/0363815 | A1* | 11/2019 | Bogenberger | G06F 1/12 |
| 2020/0177361 | A1* | 6/2020 | Gareau | H04L 7/0331 |
| 2020/0244383 | A1* | 7/2020 | He | H04W 56/00 |
| 2020/0252350 | A1* | 8/2020 | Gareau | H04L 43/0864 |
| 2020/0259578 | A1* | 8/2020 | He | H04J 3/065 |
| 2020/0328767 | A1* | 10/2020 | Zhong | H04J 3/1658 |
| 2020/0412471 | A1* | 12/2020 | Gareau | H04J 3/0697 |
| 2021/0006386 | A1* | 1/2021 | Qi | H04J 3/0676 |
| 2021/0409140 | A1* | 12/2021 | Lv | H04L 7/0012 |
| 2022/0158938 | A1* | 5/2022 | Cavaliere | H04L 45/50 |
| 2022/0286220 | A1* | 9/2022 | Stracca | H04J 3/0658 |
| 2022/0303035 | A1* | 9/2022 | He | H04W 56/00 |

FOREIGN PATENT DOCUMENTS

| | | | | |
|---|---|---|---|---|
| CN | 105281932 | A | | 1/2016 |
| CN | 106911426 | A | | 6/2017 |
| CN | 107306283 | A * | 10/2017 | ............ G06F 11/30 |
| CN | 107437973 | A | 12/2017 | |
| CN | 107800528 | A | 3/2018 | |
| CN | 108880722 | A * | 11/2018 | ......... H04J 14/0227 |
| CN | 110572228 | A | 12/2019 | |
| CN | 109167667 | B * | 4/2021 | ........... H04J 3/0667 |
| CN | 113574826 | A * | 10/2021 | ........... H04J 3/0658 |
| CN | 111201748 | B * | 6/2022 | ............ H03M 9/00 |
| EP | 3113502 | A1 * | 1/2017 | ............ G06F 13/40 |
| EP | 3300276 | A1 * | 3/2018 | .............. H04J 3/06 |
| EP | 3758272 | A1 * | 12/2020 | ........... H04J 3/0676 |
| WO | WO-2010135927 | A1 * | 12/2010 | ......... H04L 27/2656 |
| WO | WO-2018041228 | A1 * | 3/2018 | ............. H04J 3/065 |
| WO | WO-2018133402 | A1 * | 7/2018 | ........... H04J 3/0632 |
| WO | WO-2018171642 | A1 * | 9/2018 | .......... H04L 1/0006 |
| WO | WO-2018188365 | A1 * | 10/2018 | |
| WO | WO-2019001929 | A1 * | 1/2019 | ............. G06F 1/12 |
| WO | WO-2019071598 | A1 * | 4/2019 | ............ H03M 9/00 |
| WO | WO-2019084732 | A1 * | 5/2019 | ............. H04J 3/065 |
| WO | WO-2019128664 | A1 * | 7/2019 | ........ G01D 5/35303 |
| WO | WO-2020181462 | A1 * | 9/2020 | ........... H04J 3/0658 |

OTHER PUBLICATIONS

International Searching Authority. International Search Report and Written Opinion for PCT Application No. PCT/CN2020/138107 and English translation, mailed Mar. 11, 2021, pp. 1-9.

* cited by examiner

| The number of bytes | Data size | Content |
|---|---|---|
| 1-6 | 6 bytes | Destination Address = 01-80-C2-00-00-02 (hexadecimal) |
| 7-12 | 6 bytes | Source Address |
| 13-14 | 2 bytes | Ethertype = 88-09 (hexadecimal) |
| 15 | 1 byte | Subtype-0A (hexadecimal) |
| 16-18 | 3 bytes | ITU organization OUI-00-19-A7 (hexadecimal) |
| 19-20 | 2 bytes | ITU organization subtype 0X0001 |
| 21 | 4 bits | Version |
| 21 | 1 bit | Event flag, 0 represents an information protocol data unit, 1 represents a time protocol data unit |
| 21 | 3 bits | Reserved, padding full 0 |
| 22-24 | 3 bytes | Reserved, padding full 0 |
| 25-1532 | 36-1490 bytes | Data and Padding (must be an integral number of bytes) |
| Last four bytes | 4 bytes | Frame Check Sequence |

FIG. 2

| Bit | | | | | | | | The number of bytes | Offset |
|---|---|---|---|---|---|---|---|---|---|
| 7 | 6 | 5 | 4 | 3 | 2 | 1 | 0 | | |
| Transport Specific | | | | Message Type | | | | 1 | 0 |
| Reserved | | | | Version PTP | | | | 1 | 1 |
| MsgLength, length of the PTP message | | | | | | | | 2 | 2 |
| DomainNumber, representing the domain of the clock transmitting this message | | | | | | | | 1 | 4 |
| Reserved | | | | | | | | 1 | 5 |
| FlagField | | | | | | | | 2 | 6 |
| CorrectionField, used for compensating the transmission delay in the network | | | | | | | | 8 | 8 |
| Reserved | | | | | | | | 4 | 16 |
| SourcePortIdentity, the ID and port number of the clock transmitting this mssage | | | | | | | | 10 | 20 |
| Sequence ID | | | | | | | | 2 | 30 |
| ControlField, determined by the message type | | | | | | | | 1 | 32 |
| LogMsgInterval, the transmission time interval of the PTP message, determined by the message type | | | | | | | | 1 | 33 |

FIG. 3a

METHOD AND APPARATUS FOR CONFIGURING SYNCHRONISATION INFORMATION, NETWORK DEVICE, AND STORAGE MEDIUM

CROSS-REFERENCE TO RELATED APPLICATION

This application is a national stage filing under 35 U.S.C. § 371 of international application number PCT/CN2020/138107, filed Dec. 21, 2020, which claims priority to Chinese patent application No. 201911337974.8 filed Dec. 23, 2019. The contents of these applications are incorporated herein by reference in their entirety.

TECHNICAL FIELD

Embodiments of the present application relate to the technical field of communication, and in particular to a method and apparatus for configuring synchronization information, a network device and a storage medium.

BACKGROUND

With the development of the 5th generation wireless systems (5G), the flexible Ethernet (FlexE) technology plays an important role in 5G bearing technologies, and can realize ultralow delay, physical isolation and high-reliability data transmission. The access layer, convergence layer and core layer in the 5G network generally use FlexE links, and the device ports in the FlexE links are important ports in the 5G network.

The data transmission in the 5G bearer network requires higher-precision time synchronization, but the precision of network time synchronization provided in the current global positioning system (GPS) can no longer meet the nanosecond-level time synchronization requirements in the future. The clock synchronization or time synchronization information based on FlexE ports can achieve nanosecond-level synchronization precision, but among a large number of device configurations in the whole network, the manual configuration process is tedious and inefficient, and the whole configuration process will consume lots of manpower.

SUMMARY

The embodiments of the present application provide a method and apparatus for configuring synchronization information, a network device and a storage medium.

An embodiment of the present application provides a method for configuring synchronization information, including: starting detection of a predetermined synchronization message for a received Ethernet overhead frame in response to receiving a detection start instruction for the predetermined synchronization message; and, generating synchronization information corresponding to the predetermined synchronization message according to the detected predetermined synchronization message, and configuring the synchronization information to an Ethernet port of a local device.

An embodiment of the present application provides an apparatus for configuring synchronization information, including: a message detection start module configured to start detection of a predetermined synchronization message for a received Ethernet overhead frame in response to receiving a detection start instruction for the predetermined synchronization message; and, a synchronization information configuration module configured to generate synchronization information corresponding to the predetermined synchronization message according to the detected predetermined synchronization message, and configure the synchronization information to an Ethernet port of a local device.

An embodiment of the present application provides a network device, including: a memory and a processor, where the memory is configured to store programs which, when executed by the processor, cause the processor to carry out the method for configuring synchronization information described above.

An embodiment of the present application provides a computer-readable storage medium storing instructions which, when executed on a computer, cause the computer to carry out the method for configuring synchronization information described above.

BRIEF DESCRIPTION OF DRAWINGS

The accompanying drawings are provided for the further understanding of the present application, and constitute a part of the description. In addition, the accompanying drawings are used in conjunction with the following implementations to illustrate the present application and are not intended to limit the present application.

FIG. 2 shows a schematic diagram of a message format of a clock synchronization message;

FIG. 3a shows a schematic diagram of a message format of a time synchronization message;

DETAILED DESCRIPTION

The implementations of the present application will be described below in detail with reference to the accompanying drawings. It should be understood that the implementations to be described herein are merely used for describing and illustrating the present application, rather than limiting the present application. For those having ordinary skills in the art, the present application may be implemented without some of these details. The following description of the embodiments is merely provided to better understand the present application by illustrating the present application.

It is to be noted that, the term "comprise/comprising", "include/including" or any other variant thereof is non-exclusive, so that a process, method, object or device including a series of elements not only includes these elements, but also includes other elements not listed explicitly, or further includes inherent elements of this process, method, object or device. Without further restrictions, the element followed by the statement "comprising . . . " does not exclude the presence of other identical elements in the process, method, object or device including this element.

The ultrahigh precision clock and time synchronization in the communication network includes clock synchronization and time synchronization. The clock synchronization is also referred to as frequency synchronization, and the time synchronization is also referred to as phase synchronization. The stable operation of devices in the communication network is maintained by clock synchronization and time synchronization.

The embodiments of the present application provide a method and apparatus for configuring synchronization information, a network device and a storage medium, which can automatically configure the synchronization information of FlexE ports, address the problem of tedious manual configuration and improve the configuration efficiency.

Figure 1:
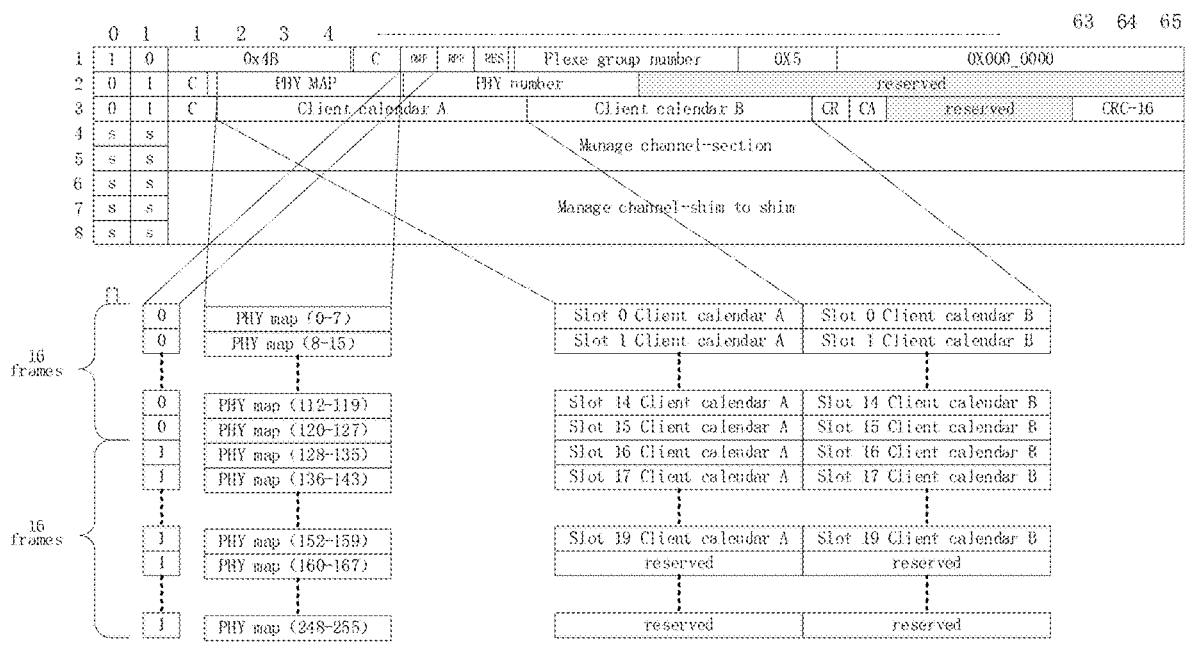
FIG. 1 shows a schematic structural diagram of a flexible Ethernet overhead frame.

FIG. 1 shows a schematic structural diagram of a flexible Ethernet overhead frame. As shown in FIG. 1, one FlexE overhead multiframe may include 32 consecutive FlexE overhead frames, and one FlexE overhead frame include 8 consecutive overhead slots. The overhead slot is actually a 64/88B data code block (OH code block). In a FlexE overhead frame, a first data code block may contain a control character in a field "0x4B", a "0 Code" character in a field "0x5" or other information. During the information transmission process, the OH code block of the first overhead frame can be determined between two docked FlexE interfaces by matching the control character and the "0 Code" character. When a receiving device identifies this OH code block, the receiving device can receive a next OH code block after receiving 1023×20 64/66B data code blocks. By that analogy, the whole FlexE frame can be extracted from a code block stream.

With continued reference to FIG. 1, the FlexE frame structure may include the following fields: open media frame (OMF), remote PHY fault (RPF), FlexE group number, PHY map, PHY number, Calendar A, Calendar B, cyclic redundancy check CRC-16, manage channel-section, manage channel-shim to shim, or the like.

In the FlexE overhead frame structure shown in FIG. 1, in addition to the above specified fields, there is some space reserved as a reserved field. In addition, a number of complete 66B code blocks are further provided, which may be used as manage channels for transferring specified information between two FlexE devices. In an example, in the FlexE overhead frame, the complete 66B block in the sixth row is used for filling a synchronization message. This synchronization message is at least one of a clock synchronization message and a time synchronization message.

FIG. 2 shows a schematic diagram of a message format of a clock synchronization message. In an embodiment of the present application, an Ethernet synchronous message channel (ESMC) message may be used as the clock synchronization message, and the quality level of a clock of a peer device can be parsed from the ESMC message.

As shown in FIG. 2, an Ethernet message type field of the ESMC message is located at the $13^{th}$ to $14^{th}$ byte data bits and occupies 2 bytes; and, an Ethernet message subtype field of the ESMC message is located at the $15^{th}$ byte data bit and occupies 1 byte.

In an embodiment of the present application, the message type of a received message is determined according to the content of the Ethernet message type field and the content of the Ethernet message subtype field of the received message.

Figure 3B:
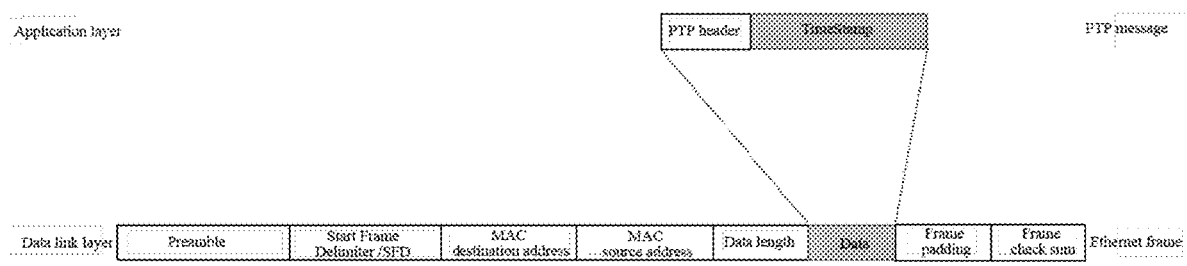
FIG. 3b shows a schematic diagram of a message format of a time synchronization message transmitted through an Ethernet frame.

FIG. 3a shows a schematic diagram of a message format of a time synchronization message, and FIG. 3b shows a schematic diagram of a message format of a time synchronization message transmitted through an Ethernet frame. In an embodiment of the present application, a precision time protocol (PTP) message may be used as the time synchronization message. The PTP is a high-precision time synchronization protocol which can achieve sub-microsecond-level time precision. As shown in FIG. 3a, the message type of the PTP message can be acquired by checking the field MessageType. As shown in FIG. 3b, the PTP message is located in a data field of an Ethernet frame, and the Ethernet frame of a data link layer is transmitted in the form of a frame after adding header information to the PTP message delivered by an application layer.

Figure 4:
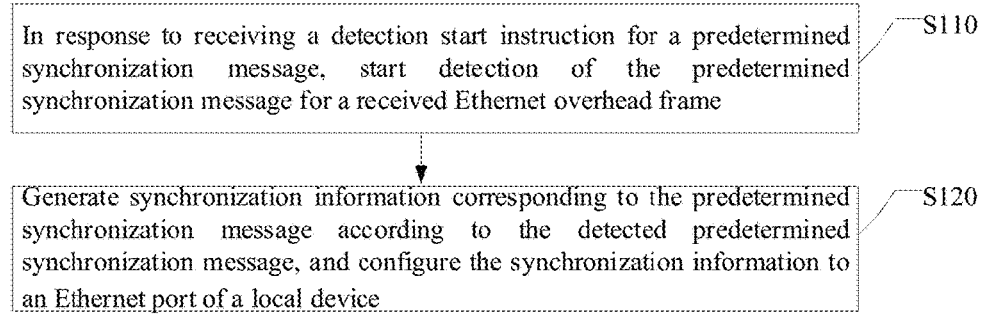
FIG. 4 shows a flowchart of a method for configuring synchronization information according to an embodiment of the present application.

FIG. 4 shows a flowchart of a method for configuring synchronization information according to an embodiment of the present application. As shown in FIG. 4, the method for configuring synchronization information according to the embodiment of the present application may include S110 and S120.

At S110, in response to receiving a detection start instruction for a predetermined synchronization message, detection of the predetermined synchronization message is started for a received Ethernet overhead frame.

At S120, synchronization information corresponding to the predetermined synchronization message is generated according to the detected predetermined synchronization message, and the synchronization information is configured to an Ethernet port of a local device.

In an embodiment of the present application, the predetermined synchronization message includes a clock synchronization message and/or a time synchronization message. By detecting a predetermined synchronization message delivered in a FlexE overhead frame, if the predetermined synchronization message corresponding to the FlexE port can be detected, the synchronization information corresponding to the predetermined message is configured for the related FlexE port, so that the configuration of the synchronization information between devices is automatically realized and configuration of user clock synchronization and/or time synchronization is simplified, thereby avoiding the asynchronous situation caused by manual configuration errors and improving the stability of the network.

In an embodiment, S110 may include: in a case that a local device permits synchronization information configuration, starting, in response to receiving a detection start instruction for a predetermined synchronization message, the detection of the predetermined synchronization message for a received Ethernet overhead frame.

In this embodiment, the local device is set to permit synchronization information configuration, so that the detection of the predetermined synchronization message can be started in response to receiving the detection start instruction. In an example, the local device may be set by a network administrator manually or by transmitting an instruction so as to permit synchronization information configuration. Further, the local device is set by default to permit synchronization information configuration, and may be set to prohibit the synchronization information configuration according to the specific situation in the practical application scenarios.

In an embodiment, prior to S110, the method may further include: S101, reading a value of a predetermined number of bits from the received Ethernet overhead frame; and S102, determining the received detection start instruction according to the value of the predetermined number of bits, the detection start instruction including starting clock message detection, starting time message detection, or starting both clock message detection start and time message detection.

At S101 and S102, by reading the content of the predetermined number of bits set in the FlexE overhead frame, it is determined for which synchronization message the detection is started.

In the FlexE overhead frame structure in this embodiment of the present application, the predetermined number of bits include at least two bits. For example, the content of the two bits may be preset to start or end clock message detection and time message detection. In an example, the content of the two bits may be one of 00, 01, 10 and 11, and a corresponding message detection mode is one of starting clock message detection, starting time message detection, starting both clock message detection and time message detection, and ending both clock message detection and time message detection.

In this embodiment, if the predetermined number of bits include more than two bits, the content of the more than two bits may be preset to represent one of the above message detection modes. The content of the bits corresponding to a specified message detection mode in the more than two bits may be set according to actual needs.

As described above, starting clock message detection, starting time message detection and starting both clock message detection and time message detection are detection start instructions in the embodiment of the present application, and ending both clock message detection and time message detection is a detection end instruction in the embodiment of the present application.

In an embodiment, if the predetermined synchronization message is a clock synchronization message, the corresponding synchronization information includes clock configuration information; and, S120 may include: S21, when a message type of a clock synchronization message is identified from a received Ethernet overhead frame, acquiring the clock synchronization message in the Ethernet overhead frame; and S22, if a physical address of a clock source device carried in the clock synchronization message is different from a physical address of the local device, generating clock configuration information according to the clock synchronization message, and configuring the clock configuration information to an Ethernet port of the local device.

In this embodiment, if the physical address of the clock source device carried in the clock synchronization message is the same as the physical address of the local device, it is indicated that the local device is the clock source device of a peer device. In this case, clock synchronization configuration is not performed on the local device, and the clock synchronization message may for example be discarded. If the physical address of the clock source device carried in the clock synchronization message is different from the physical address of the local device, clock synchronization configuration is performed.

As described in the above embodiment, to configure synchronization information for the local device, the following conditions needs to be satisfied: firstly, the local device needs to permit synchronization information configuration; secondly, the detection of the predetermined synchronization message is started according to a received Ethernet overhead frame; and thirdly, the predetermined synchronization message is detected from the received Ethernet overhead frame.

In an embodiment, before the detection of the predetermined synchronization message from the received Ethernet overhead frame is started, if a message in the Ethernet overhead frame is received, it is not detected whether this message is a predetermined synchronization message, and this message is directly discarded. Only when the local device starts the detection of the predetermined synchronization message from the received Ethernet overhead frame and identifies that the message type in the Ethernet overhead frame is the message type of the predetermined synchronization message, a clock synchronization message in this Ethernet overhead frame is acquired, and synchronization configuration is performed on the FlexE port of the local device.

As an example, the peer device transmits an ESMC message through a FlexE overhead frame, and the local device can receive this ESMC message, but directly discards this message without identifying this message. Only when the local device starts clock message detection and identifies, through analyzing the acquired ESMC message in the FlexE overhead frame, that the message type is 0x88090A, clock configuration is performed at the FlexE port of the local device.

As an example, the peer device transmits a PTP message through FlexE overhead frame, and the local device can receive this PTP message, but directly discards this message without identifying this message. Only when the local device starts time message detection and identifies, through analyzing the acquired PTP message in the FlexE overhead frame, that the message type is 0x88f7, clock configuration is performed at the FlexE port of the local device.

In an embodiment, during clock synchronization configuration, S22 may include: S221, acquiring clock configuration information containing a clock quality level carried in the clock synchronization message; S222: detecting whether there is configured clock configuration information in the local device; S223: setting a priority of the generated clock configuration information according to a result of detection and the clock quality level; and S224: configuring, according to the set priority of the clock configuration information, the generated clock configuration information to an Ethernet port of the local device.

Through S221 to S224, determination of clock configuration information by a synchronization status message (SSM) algorithm in the embodiment of the present application have been described.

The SSM is a group of codes for identifying the quality level of a clock source, and different SSM levels are allocated to a plurality of clock sources according to the clock precision. The higher the clock precision is, the higher the SSM level is. Generally, the clock reference source with the highest SSM level may be used for clock configuration in the local device. When a fault occurs in the clock reference source with the highest SSM level, a clock board may switch to a clock reference source with a second highest level.

In this embodiment, during the configuration of clock configuration information, the higher the clock quality level is, the higher the priority of the clock configuration information is. In addition, it may be considered whether there is configured clock configuration information in the local device so as to determine the priority of the clock configuration information in the clock synchronization message.

In an embodiment, S223 may include: S223-01, if there is no configured clock configuration information, setting the priority of the generated clock configuration information according to the clock quality level; and S223-02, if there is configured clock configuration information, setting the priority of the generated clock configuration information according to the clock quality level, and setting the priority of the generated clock configuration information to be lower than the priority of the configured clock configuration information.

In this embodiment, in the process of setting the priority of clock configuration information, it may be determined whether there is other clock configuration information in the current device, if no, the configuration directly starts from priority 1, and if yes, the configuration starts from a priority next to the priority of the configured clock configuration information. In an example, the other clock configuration information may be manually configured line extraction clock, which is a clock signal that is exacted from a received line signal and satisfies the clock precision condition. In an example, the other clock configuration information may be clock configuration information manually configured by a network administrator.

As described in the above embodiment, the higher the clock quality level is, the higher the priority of the clock configuration information corresponding to the clock quality level is, and, the priority of the clock configuration information configured previously is higher the priority of the clock configuration information configured later.

In an embodiment, if the predetermined synchronization message is a time synchronization message, the corresponding synchronization information includes time synchronization configuration information; and S120 may include: S31, when a message type of time synchronization message is identified from the Ethernet overhead frame, acquiring the detected time synchronization message; S32, successively acquiring each Ethernet port group of the local device, and generating time synchronization configuration information for ports in each Ethernet port group according to the detected time synchronization message; and S33, configuring the time synchronization configuration information to the ports in each Ethernet port group.

In this embodiment, the local device and the peer device may be connected by a FlexE link, and an Ethernet port group (FlexE group) is configured by using a FlexE port of the local device and a FlexE port of the peer device. The FlexE group is a group of 1 to N bound Ethernet physical layer ports, where N is an integer greater than or equal to 1. The FlexE group ID may be used to indicate an Ethernet physical layer port of the bound Ethernet physical layer ports which is being configured. By configuring the FlexE group, it can be ensured that both sides of the FlexE link can find each other as neighbors.

In an embodiment, for FlexE ports in each Ethernet port group, S32 may include S321 to S323.

At S321, time characteristic information is extracted from the time synchronization message, and is compared with time characteristic information of the Ethernet port of the local device.

At S322, the state of ports in each Ethernet port group is determined based on a result of comparison, the state of ports being master port or slave port with the master port being configured to issue the synchronization time and the slave port being configured to receive the synchronization time.

At S323, time synchronization configuration information for the ports in each Ethernet port group is generated according to at least the state of ports.

Through S321 to S323, determination of time synchronization configuration information by a best master clock (BMC) algorithm in the embodiment of the present application has been described.

In an embodiment, the time synchronization configuration information for ports in each Ethernet port group may further include: a transmission mode of a communication stream, a manner of carrying a timestamp when transmitting a message during time synchronization, and a package sending rate of PTP messages. The timestamp refers to the moment when each message is transmitted during the synchronization process. In an example, the transmission mode of a communication stream may be configured as a layer-2 multicast mode, the manner of carrying a timestamp when transmitting a message during time synchronization may be configured as a two-step clock mode, and the package sending rate of PTP messages may be configured as a value defaulted by the predetermined device.

The best clock may be statically specified by manual configuration, or may be dynamically determined by a BMC-based algorithm. The main process of the BMC-based algorithm is as follows. Among different clock nodes (e.g., the local device and the peer device), a clock node may be selected as the best clock by interactively announcing the time characteristic information such as time level and time precision carried in an announce message; and, a master-slave relationship between the local device and the peer device, the port state of the local device and the port state of the peer device are determined according to the best clock.

In an embodiment, the S33 may include S331 to S333.

At S331, it is detected whether there is a port having configured time synchronization information in each Ethernet port group.

At S332, if there is no port having configured time synchronization information, the time synchronization configuration information is successively configured to ports in each Ethernet port group starting from a second port in a port order.

At S333, if there is a port having configured time synchronization configuration information, the time synchronization configuration information is successively configured to ports in each Ethernet port group starting from a predetermined port in a port order, the predetermined port being a port next to the port having configured time synchronization configuration information.

In this embodiment, for FlexE ports in each Ethernet port group, it is firstly detected whether there is a port having configured time synchronization configuration information in this Ethernet port group of a current device. If there is no port having configured time synchronization configuration information in this Ethernet port group, the configuration of the time synchronization configuration information starts from a second FlexE port; and, if there is a port having configured time synchronization configuration information in this Ethernet port group, the configuration of the time synchronization configuration information starts from a port next to the port having the configured time synchronization configuration information. The first FlexE port in the Ethernet port group is a reserved port, and no time synchronization configuration information is configured at the first FlexE port.

In an embodiment, if the predetermined synchronization message is a clock synchronization message and a time synchronization message, corresponding synchronization information includes clock configuration information and time synchronization configuration information; and, S210 may include S41 to S43.

At S41, when a message type of a clock synchronization message and a message type of a time synchronization message are identified from a received Ethernet overhead frame, a clock synchronization message and a time synchronization message in the Ethernet overhead frame are acquired.

The process of identifying a message type of a clock synchronization message from a received Ethernet overhead frame at S41 is the same as that of identifying a message type of a clock synchronization message from a received Ethernet overhead frame at S21 in the above embodiments. The process of identifying a message type of a time synchronization message from a received Ethernet overhead frame at S41 is the same as that of identifying a message type of a time synchronization message from a received Ethernet overhead frame at S31 in the above embodiments. Therefore, these processes may refer to the corresponding processes in the above method embodiments and will not be repeated here.

At S42, if a physical address of a clock source device carried in the clock synchronization message is different from a physical address of the local device, clock configuration information is generated according to the clock synchronization message, and is configured to an Ethernet port of the local device.

This process is the same as S22 in the above embodiments, and reference may be made to the corresponding process in the above method embodiments and will not be repeated here.

At S43, if the physical address of the clock source device carried in the clock synchronization message is the same as the physical address of the local device, each Ethernet port group of the local device is successively acquired, time synchronization configuration information for ports in each Ethernet port group is generated according to the detected time synchronization message, and the time synchronization configuration information is configured to the ports in each Ethernet port group.

In other words, if the physical address of the clock source device is different from the physical address of the local device, it indicates that no clock loop occurs in the FlexE network formed by FlexE links, and clock synchronization configuration can be performed on the local device; and, if the physical address of the clock source device is the same as the physical address of the local device, it indicates that a clock loop occurs in the FlexE network formed by FlexE links. In this case, a master-slave relationship between network devices in the FlexE network can be determined by time synchronization configuration. The clock on a network device serving as a master node is called a master clock, and the clock on a network device serving as a slave node is called a slave clock. The port issuing the synchronization time is called a master port, and the port receiving the synchronization time is called a slave port. After the time synchronization configuration, a hierarchical relationship between devices in the FlexE network and a hierarchical relationship between ports in the devices are redefined, so that the clock loop is broken, the normal clock configuration and time configuration of the FlexE network is maintained, and the robustness of clock configuration and time configuration of the system is improved.

In this embodiment, when both the clock message detection and the time message detection are started, clock configuration and time configuration are performed on FlexE ports in each Ethernet port group configured for the local device according to the clock synchronization message and time synchronization message detected from the received FlexE overhead frame.

In an embodiment, the method for configuring synchronization information may further include S130 to S150.

At S130, in response to receiving a detection end instruction for a predetermined synchronization message, the detection of the predetermined synchronization message is ended for the received Ethernet overhead frame.

At S140, if the local device has started the detection of the predetermined synchronization message, the configured synchronization information corresponding to the predetermined synchronization message is deleted.

At S150, if the local device has manually configured synchronization information, the manually configured synchronization information is reserved.

In this embodiment, if a detection end instruction for the predetermined synchronization message is received, the predetermined synchronization message is no longer detected from the received Ethernet overhead frame, and the configured synchronization information corresponding to the predetermined synchronization message is deleted. The configured synchronization information is deleted, so as to restart the detection of the predetermined synchronization message from the Ethernet overhead frame, generate new synchronization information corresponding to the predetermined synchronization message according to the re-detected predetermined synchronization message, and configure the Ethernet ports of the local device according to the new synchronization information corresponding to the predetermined synchronization message.

In addition, the manually configured synchronization information of the local port may have a priority higher than that of the automatically configured synchronization information, the configured synchronization information corresponding to the predetermined synchronization message is deleted, and the manually configured synchronization information is reserved, so that the normal time synchronization and/or clock synchronization of the local device can be ensured.

In order to better understand the present application, the method for configuring synchronization information according to the illustrative embodiments of the present application will be described with reference to FIGS. 5-7. It is to be noted that these embodiments are not intended to limit the scope of the present application. For convenience of description, in the following embodiments, the peer device may be called a device A, and the local device may be called a device B. In addition, the peer device and the local device in the present application are network devices that support FlexE ports such as router devices or switch devices that support FlexE ports or the like.

Figure 5:
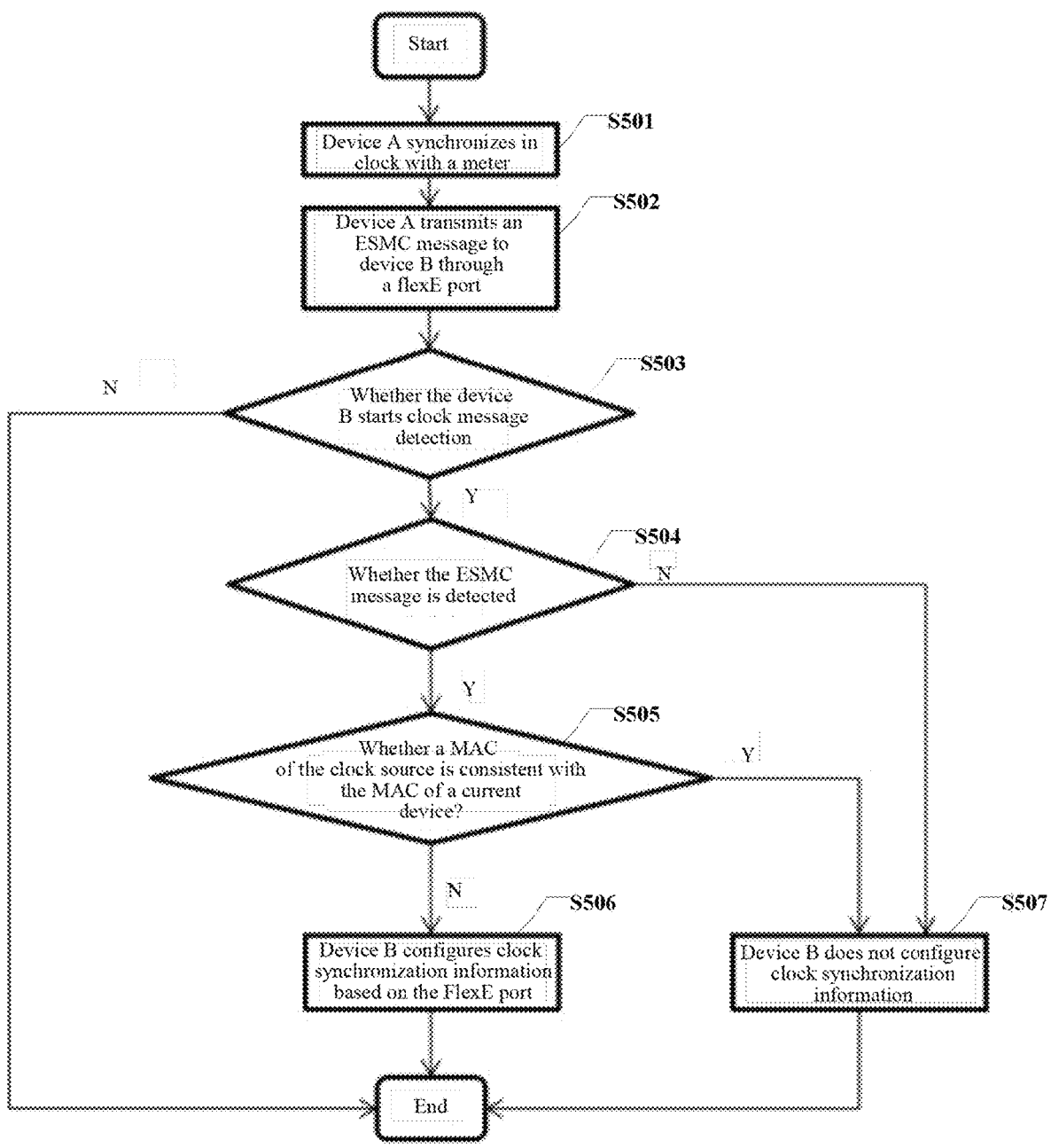
FIG. 5 shows a flowchart of a method for configuring synchronization information according to another embodiment.

FIG. 5 shows a flowchart of a method for configuring synchronization information according to another embodiment. As shown in FIG. 5, the method for configuring synchronization information according to this embodiment of the present application may include S501 to S507.

At S501, a device A synchronizes a clock of a meter through an Ethernet port.

In this operation, the device A is connected to a clock source meter through an Ethernet port. An SSM algorithm is enabled, an Ethernet extraction clock is configured, and it is determined that the clock of the clock source is synchronized by the device A.

At S502, the device A transmits an ESMC message to a device B through a FlexE port.

In this operation, the device A and the device B are connected through a FlexE link, and a FlexE group is configured, thereby ensuring that both sides can find each other as neighbors.

At S503, it is determined whether the device B starts clock message detection. If yes, S504 is executed; and, if no, this process is ended.

In this operation, the device B can receive the ESMC message transmitted by the device A, but directly discards this message without identifying this message. If the device B starts clock message detection, the device B will analyze the ESMC message acquired in the FlexE overhead frame to identify that the message type is 0x88090A, so that the device B performs FlexE extraction clock configuration.

At S504, it is determined whether the ESMC message is detected. If yes, S505 is executed; and, if no, S507 is executed.

At S505, it is determined whether a media access control (MAC) address of the clock source is consistent with a MAC address of the device B; if no, S506 is executed; and, if yes, S507 is executed.

In this operation, the MAC address in the message is used to determine the location of a network device and may be referred to as an Ethernet address or a hardware address. The MAC address of the clock source node in the ESMC message is acquired and compared with the MAC address of a current device. If this MAC address is different from the MAC address of the current device, a next step is executed, and if this MAC address is the same as the MAC address of the current device, the FlexE extraction clock is not configured.

At S506, the device B configures FlexE-based clock synchronization, and this process is ended.

At S507, the device B does not configure FlexE-based clock synchronization, and this process is ended.

At S506, when configuring clock synchronization information based on FlexE port, the device B may indicate on FlexE ports of which Ethernet port group the clock configuration is performed according to the FlexE Group ID of a current port. When setting a priority of clock configuration information, it may be firstly detected whether there is other clock configuration information in the current device, if no, the configuration directly starts from priority 1; and, if yes, the clock configuration starts from a priority next to the priority of the configured exaction clock.

In this embodiment, the device A and the device B are connected to each other through a FlexE port. The device A synchronizes with the clock of the meter through an Ethernet port and enables an SSM algorithm to determine the quality level of the clock source. The device A may transmit an ESMC message containing the quality level of the clock source at all ports. The device B automatically configures clock synchronization according to the detected ESMC message containing the quality level of the clock source. Thus, configuration of user clock synchronization is simplified.

Figure 6:
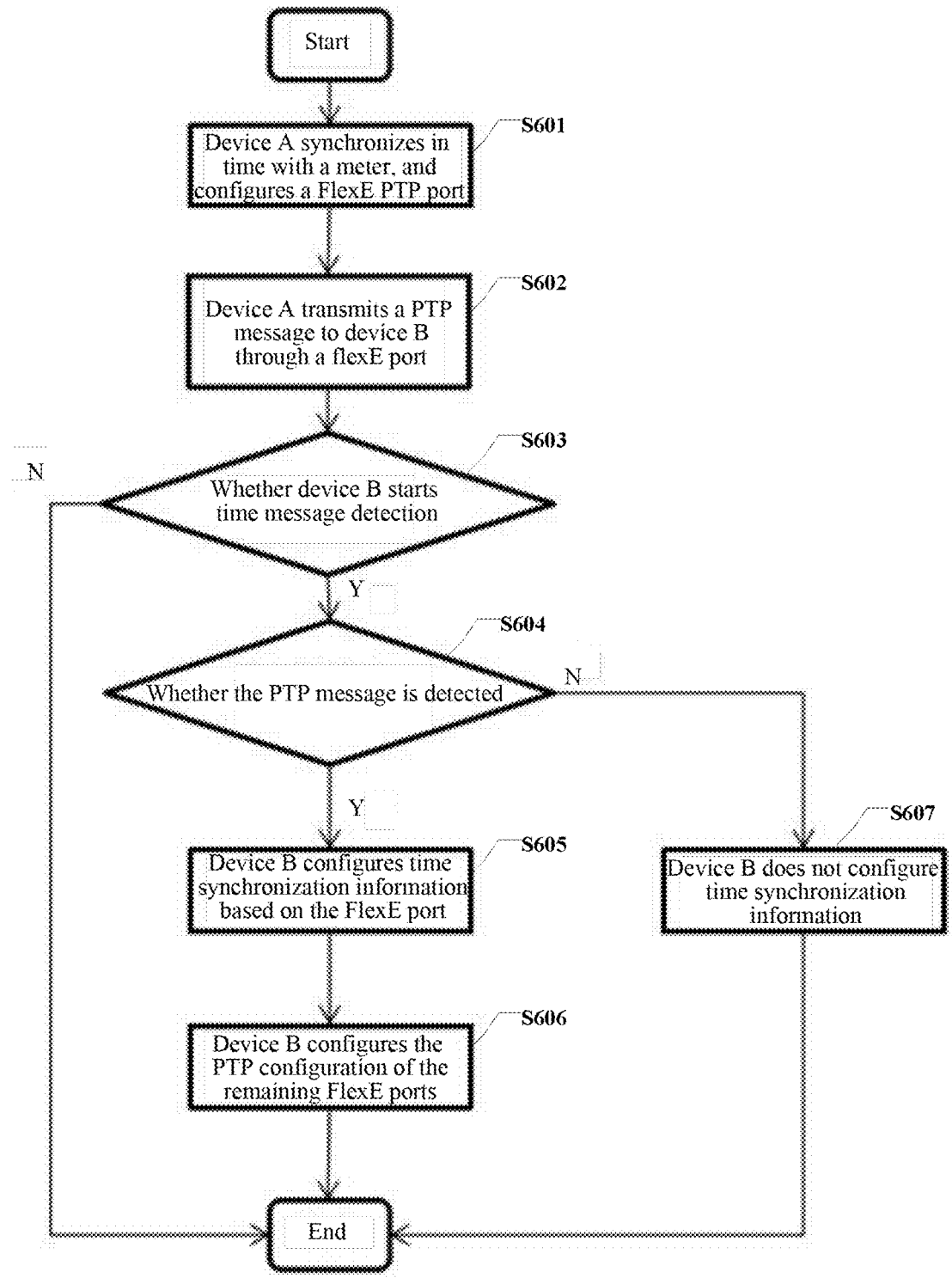
FIG. 6 shows a flowchart of a method for configuring synchronization information according to still another embodiment.

FIG. 6 shows a flowchart of a method for configuring synchronization information according to still another embodiment. As shown in FIG. 6, the method for configuring synchronization information according to this embodiment of the present application may include S601 to S607.

At S601, a device A synchronizes in time with a meter, and configures a FlexE PTP port.

In this operation, the FlexE PTP port represents a FlexE port that performs time synchronization information based on a PTP protocol. The device A can synchronize in time with a clock source. The device A and device B are connected through a FlexE link, and a FlexE group is configured, to ensure that both sides can find each other as neighbors.

At S602, the device A transmits a PTP message to the device B through the FlexE port.

At S603, it is determined whether the local device starts time message detection. If yes, S604 is executed; and, if no, this process is ended.

At S604, it is determined whether the PTP message is detected. If yes, S605 is executed; and, if no, S607 is executed.

In this operation, the device A configures and enables PTP ports in a FlexE group. The device A transmits the PTP message through the overhead frame of the FlexE port, and the device B can receive the PTP message transmitted by the device A, but directly discards this message without identifying this message. After the device B starts clock message detection, the PTP message acquired from the FlexE overhead frame is analyzed to identify that the message type is 0x88f7, and the device B performs subsequent FlexE PTP configuration.

At S605, the device B configures time synchronization information based on the FlexE port.

In this operation, when configuring time synchronization information based on the FlexE port, the device B indicates on FlexE ports of which Ethernet port group the clock configuration is performed according to the FlexE Group ID. When configuring FlexE ports in a current FlexE group, it is firstly detected whether there are other PTP port configurations in the FlexE group of the current device. If no, the configuration starts from a FlexE port number (PortNum) of 2; and, if yes, the configuration starts from a PortNum next to the largest PortNum.

At S606, the device B configures time synchronization information of the remaining FlexE ports.

In this operation, all configured FlexE groups of the device B are detected, and FlexE PTP ports are configured for respective FlexE groups in an order of FlexE Group ID. The configuration process may refer to S605.

At S607, the device B does not perform time synchronization configuration, and this process is ended.

In this example, the device A and the device B are connected through the FlexE port. The device A synchronizes in time with a meter through an Ethernet port, configures PTP function of the FlexE port, and transmits a time synchronization message to the device B. The device B enables a BMC algorithm and automatically performs time synchronization configuration based on the FlexE port. Thus, the operations of time synchronization configuration are simplified.

Figure 7:
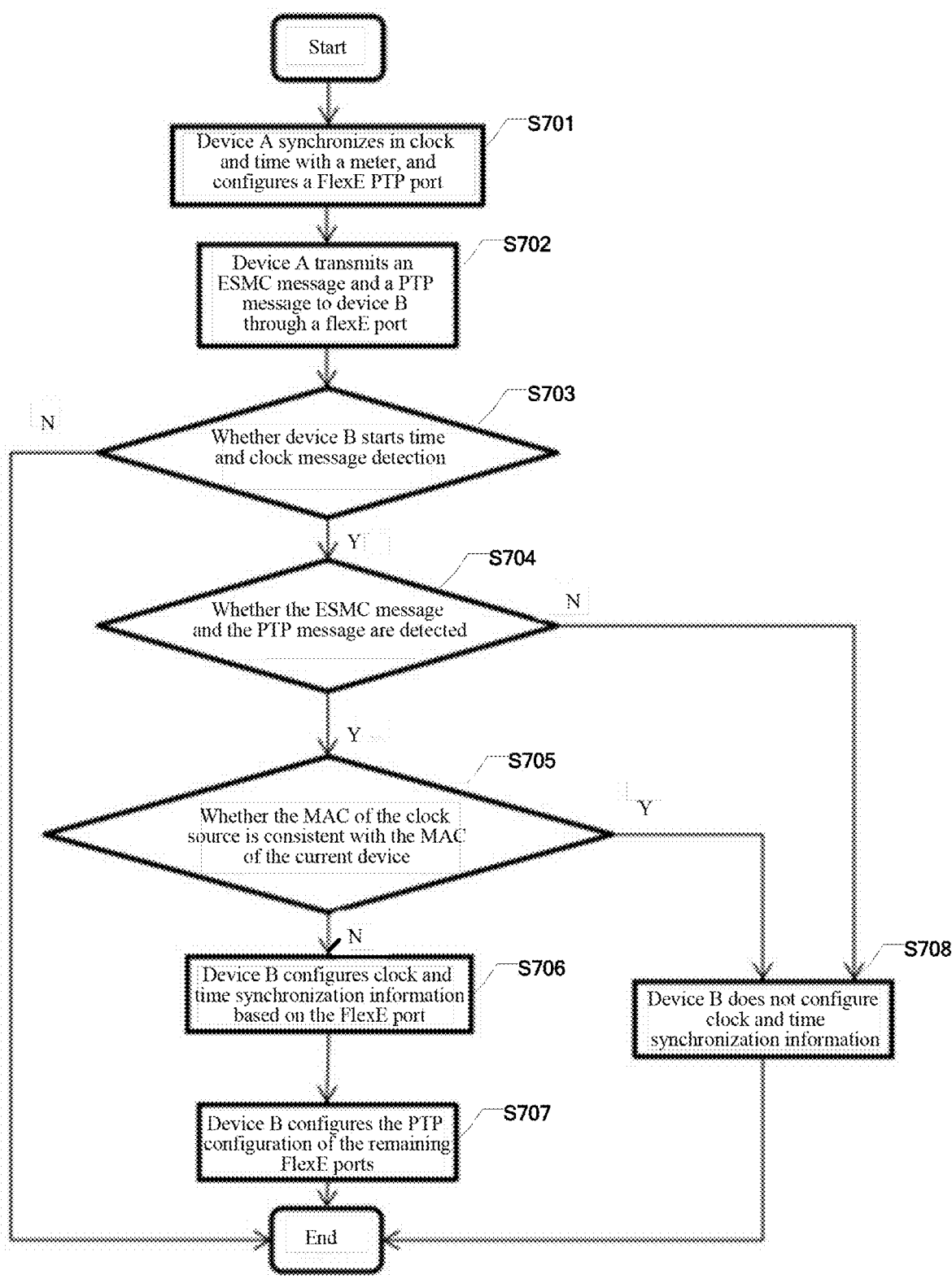
FIG. 7 shows a flowchart of a method for configuring synchronization information according to yet another embodiment.

FIG. 7 shows a flowchart of a method for configuring synchronization information according to still another embodiment. As shown in FIG. 7, the method for configuring synchronization information according to this embodiment of the present application may include S701 to S708.

At S701, a device A synchronizes in clock and time with a meter, and configures a FlexE PTP port.

In this operation, the device A is connected to a time source meter through an Ethernet port. An SSM algorithm and a BMC algorithm are enabled, an Ethernet extraction clock and PTP are configured to be synchronized, and it is determined that the clock and time of the meter are synchronized with the device A. The device A and device B are connected through a FlexE link, and a FlexE group is configured, thereby ensuring that both sides can find each other as neighbors.

At S702, the device A transmits an ESMC message and a PTP message to a device B through a FlexE port.

At S703, it is determined whether the device B starts both clock message detection and time message detection. If yes, S704 is executed; and, if no, this process is ended.

At S704, it is determined whether the ESMC message and the PTP message are detected. If yes, S705 is executed; and, if no, S708 is executed.

In an embodiment, the device A transmits the ESMC message and the PTP message through the FlexE overhead frame, and the device B can receive the ESMC message and the PTP message transmitted by the device A, but directly discards these messages without identifying these messages. The device B starts both clock message detection and time message detection. In this case, the device B analyzes the ESMC and PTP messages acquired in the FlexE overhead frame to identify that the message types are 0x88090A and 0x88f7, and the device B configures the clock configuration information of the FlexE port and the time synchronization configuration information of the FlexE port based on PTP.

At S705, it is determined whether a MAC address of the clock source is consistent with a MAC address of the device B; if no, S706 is executed; and, if yes, S708 is executed.

At S706, the device B configures FlexE-based clock synchronization information and time synchronization information.

At S706, the operation of configuring FlexE-based clock synchronization information by the device B is the same as S605 in FIG. 5, and the operation of configuring FlexE-based time synchronization information by the device B is the same as S605 in FIG. 6. Therefore, these operations may refer to the corresponding processes in the above method embodiments and will not be repeated here.

At S707, the device B configures time synchronization information of the remaining FlexE ports.

S707 is the same as the operation of configuring time synchronization information of the remaining FlexE ports by the device B at S606 in FIG. 6, so this operation may refer to the corresponding process in the above method embodiments and will not be repeated here.

In the above operation, a MAC address of a clock source node in the ESMC message is acquired and is compared with a MAC address of a current device. If this MAC address is different from the MAC address of the current device, the device B configures FlexE-based clock synchronization information; and, if this MAC address is the same as the MAC address of the current device, it indicates that the time of the FlexE ports is synchronized.

At S708, the device B does not configure clock and time synchronization information.

In this operation, not configuring clock and time synchronization information means that clock synchronization configuration and time synchronization configuration are not performed.

In the method for configuring synchronization information in this embodiment, in an application scenario where the device A and the device B are connected through a FlexE port, the device A synchronizes in clock and time with the meter through an Ethernet port and enables ESMC and BMC algorithms. The device A transmits the ESMC message through all ports. For the PTP message, it is necessary to configure the PTP function of the FlexE port. The device B automatically generates clock configuration information and PTP port configuration information. Thus, configuration of user time synchronization is simplified.

Figure 8:
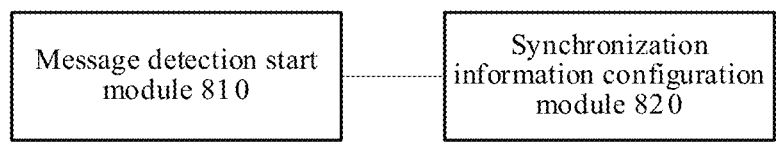
FIG. 8 shows configuration of synchronization information according to an embodiment of the present application.

The apparatus for configuring synchronization information according to an embodiment of the present application will be described in detail blow with reference to the accompanying drawings. FIG. 8 shows a schematic structural diagram of an apparatus for configuring synchronization information according to an embodiment of the present application. As shown in FIG. 8, the apparatus for configuring synchronization information include a message detection start module 810 and a synchronization information configuration module 820.

The message detection start module 810 is configured to: in response to receiving a detection start instruction for a predetermined synchronization message, start a detection of the predetermined synchronization message for a received Ethernet overhead frame.

The synchronization information configuration module 820 is configured to generate synchronization information corresponding to the predetermined synchronization message according to the detected predetermined synchronization message, and configure the synchronization information to an Ethernet port of a local device.

In an embodiment, in a case that a local device permits synchronization information configuration, the message detection start module 810 is configured to, in response to a detection start instruction for a predetermined synchronization message, start the detection of the predetermined synchronization message for a received Ethernet overhead frame.

In an embodiment, the apparatus for configuring synchronization information may further include: an information reading module configured to read a value of a predetermined number of bits from the received Ethernet overhead frame, and an instruction determination module configured to determine the received detection start instruction according to the value of the predetermined number of bits, the detection start instruction including starting clock message detection, starting time message detection, or starting both clock message detection and time message detection.

In an embodiment, the predetermined synchronization message is a clock synchronization message, and the synchronization information includes clock configuration information. The synchronization information configuration module 820 may include: a first message acquisition unit configured to, when a message type of a clock synchronization message is identified from a received Ethernet overhead frame, acquire the clock synchronization message in the Ethernet overhead frame. The synchronization information configuration module 820 is further configured to, if a physical address of a clock source device carried in the clock synchronization message is different from a physical address of a local device, generate clock configuration information according to the clock synchronization message, and configure the clock configuration information to an Ethernet port of the local device.

In an embodiment, the synchronization information configuration module 820 may further include: a clock configuration information acquisition unit, configured to acquire clock configuration information containing a clock quality level carried in the clock synchronization message; a clock configured information detection unit, configured to detect whether there is configured clock configuration information in the local device; a priority setup unit, configured to set a priority of a generated clock configuration information according to a result of detection and the clock quality level; and, a clock information configuration unit, configured to configure, according to the set priority of the clock configuration information, the generated clock configuration information to an Ethernet port of the local device.

In an embodiment, the priority setup unit is further configured to, if there is no configured clock configuration information, set the priority of the generated clock configuration information according to the clock quality level; and, if there is configured clock configuration information, set the priority of the generated clock configuration information according to the clock quality level, and set the priority of the generated clock configuration information to be lower than a priority of the configured clock configuration information.

In an embodiment, the predetermined synchronization message is a time synchronization message, and the synchronization information includes time synchronization configuration information. The synchronization information configuration module 820 may include: a second message acquisition unit, configured to, when a message type of a time synchronization message is identified from an Ethernet overhead frame, acquire the detected time synchronization; a time synchronization configuration information generation unit, configured to successively acquire each Ethernet port group of the local device and generate time synchronization configuration information for ports in each Ethernet port group according to the detected time synchronization message; and a time information configuration unit, configured to configure the time synchronization configuration information to the ports in each Ethernet port group.

In an embodiment, the time synchronization configuration information generation unit is further configured to extract time characteristic information from the time synchronization message, and compare the extracted time characteristic information with time characteristic information of the Ethernet ports of the local device; determine the state of ports in each Ethernet port group according to a result of comparison, the state of ports being master port or slave port with the master port being configured to issue a synchronization time and the slave port being configured to receive the synchronization time; and, generate time synchronization configuration information for the ports in each Ethernet port group according to at least the state of ports.

In an embodiment, the time information configuration unit is further configured to detect whether there is a port having configured time synchronization information in each Ethernet port group; if no, successively configure, in the port order and starting from the second port, the time synchronization configuration information to ports in each Ethernet port group; and, if yes, successively configure, in a port order and starting from a predetermined port, the time synchronization configuration information to ports in each Ethernet port group, the predetermined port being a port next to the port having configured time synchronization configuration information.

In an embodiment, the predetermined synchronization message includes a clock synchronization message and a time synchronization message, and the synchronization information includes clock configuration information and time synchronization configuration information; and, the synchronization information configuration module 820 may include a third message acquisition unit, the clock information configuration unit and the time information configuration unit.

The third message acquisition unit is configured to, when a message type of a clock synchronization message and a message type of a time synchronization message are identified from a received Ethernet overhead frame, acquire the clock synchronization message and the time synchronization message in the Ethernet overhead frame.

The clock information configuration unit is further configured to, if the physical address of a clock source device carried in the clock synchronization message is different from the physical address of the local device, generate clock configuration information according to the clock synchronization message, and configure the clock configuration information to an Ethernet port of the local device.

The time information configuration unit is further configured to, if the physical address of the clock source device carried in the clock synchronization message is the same as the physical address of the local device, successively acquire each Ethernet port group of the local device, generate time synchronization configuration information for ports in each Ethernet port group according to the detected time synchronization message, and configure the time synchronization configuration information to the ports in each Ethernet port group.

In an embodiment, the apparatus for configuring synchronization information may further include: a message detection end module configured to, in response to receiving a detection end instruction for a predetermined synchronization message, end the detection of the predetermined synchronization message for the received Ethernet overhead frame; a synchronization information deletion unit configured to delete the configured synchronization information corresponding to the predetermined synchronization message if the local device has started the detection of the predetermined synchronization message; and, a manual configuration reservation unit configured to reserve the manually configured synchronization information if the local device has manually configured synchronization information.

This embodiment of the present application provides an apparatus for configuring synchronization information in a flexible Ethernet, which realizes the automatic configuration of clock and/or time synchronization information based on a FlexE port, so that t the automatic synchronization configuration is simplified, the asynchronous situation caused by manual configuration errors is avoided, and the stability of the network is improved.

It is clear that the present application is not limited to the specific configurations and processes described in the above embodiment and shown in the drawings. For convenience and conciseness of description, the detailed description of the known methods has been omitted herein. The specific operation processes of the systems, modules and units described above may refer to the corresponding processes in the above method embodiments and will not be repeated here.

Figure 9:
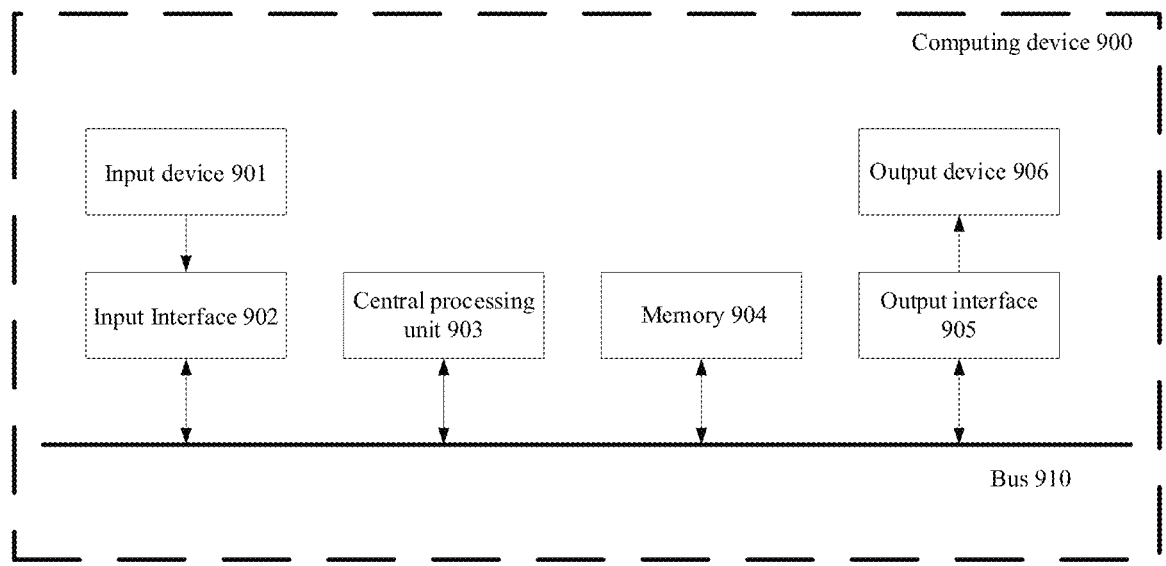
FIG. 9 shows a structural diagram of a hardware architecture of a computing device that can implement the method and apparatus according to the embodiments of the present application.

FIG. 9 shows a structural diagram of a hardware architecture of a computing device that can implement the method and apparatus for configuring synchronization information according to the embodiments of the present application.

As shown in FIG. 9, the computing device 900 includes an input device 901, an input interface 902, a central processing unit 903, a memory 904, an output interface 905 and an output device 906. The input interface 902, the central processing unit 903, the memory 904 and the output interface 905 are connected to one another through a bus 910. The input device 901 and the output device 906 are connected to the bus 910 through the input interface 902 and the output interface 905, respectively, so as to be connected to other components of the computing device 900.

In an embodiment, the input device 901 receives input information from the outside (for example, a FlexE port of a peer device), and transmits the input information to the central processing unit 903 through the input interface 902. The central processing unit 903 processes the input information based on computer-executable instructions stored in the memory 904 to generate output information, temporarily or permanently stores the output information in the memory 904, and transmits the output information to the output device 906 through the output interface 905. The output device 906 outputs the output information to the outside of the computing device 900 for use by a user.

In an embodiment, the computing device 900 shown in FIG. 9 may be implemented as a network device. The network device may include: a memory configured to store programs; and, a processor configured to execute the programs stored in the memory to carry out the method for configuring synchronization information described in the above embodiments.

In accordance with the embodiments of the present application, the processes described above with reference to the flowcharts may be implemented as computer software programs. For example, an embodiment of the present application includes a computer program product, including computer programs tangibly embodied on a machine-readable medium, the computer programs containing program codes used for carrying out the methods shown in the flowcharts. In such an embodiment, the computer programs may be downloaded and installed from a network, and/or installed from a removable storage medium.

It should be understood by a person having ordinary skills in the art that, all or some of the steps in the methods disclosed above and the functional modules/units in the systems and devices disclosed above may be implemented as software, firmware, hardware and suitable combinations thereof. In a hardware implementation, the division of the functional modules/units mentioned above does not necessarily correspond to the division of physical components. For example, one physical component may have multiple functions, or one function or operation may be cooperatively executed by a number of physical components. Some or all of the physical components may be implemented as software executed by processors such as central processing unit, a digital signal processor or a microprocessor, or implemented as hardware, or implemented as integrated circuits such as application-specific integrated circuits. Such software may be distributed on a computer-readable medium, and the computer-readable medium may include computer storage medium (or non-temporary medium) and communication medium (or temporary medium). As is well known to a person having ordinary skills in the art, the term computer storage medium includes volatile or non-volatile and removable or non-removable medium implemented in any method or technology used for storing information (such as computer-readable instructions, data structures, program modules or other data). The computer storage medium includes, but not limited to, RAMs, ROMs, EEPROMs, flash memories or other memory technologies, CD-ROMs, digital video disks (DVDs) or other optical disk storages, magnetic cassettes, magnetic tapes, magnetic disk storages or other magnetic storage devices, or any other medium which can be used to store desired information and can be accessed by computers. In addition, as is well known to a person having ordinary skills in the art, the communication medium generally contains computer-readable instructions, data structures, program modules or other data in modulation data signals such as carrier waves or other transmission mechanisms, and may include any information delivery medium.

In the method and apparatus for configuring synchronization information, the network device and the storage medium according to the embodiments of the present application, the automatic synchronization configuration of clock and/or time based on a FlexE port can be realized, configuration of user clock and/or time synchronization is simplified, and the asynchronous situation caused by manual configuration errors is avoided. In addition, the efficiency of synchronization configuration can be improved, and the stability of the network can be enhanced.

It should be understood that, the foregoing implementations are merely illustrative implementations for describing the principle of the present application, and the present application is not limited thereto. A person having ordinary skills in the art can make various variations and improvements without departing from the essence of the present application, and those variations and improvements shall fall into the protection scope of the present application.

The invention claimed is:

1. A method for configuring synchronization information, comprising:
   starting detection of a predetermined synchronization message for a received Ethernet overhead frame in response to receiving a detection start instruction for the predetermined synchronization message, the detection start instruction comprising at least one of starting clock message detection and starting time message detection; and
   generating synchronization information corresponding to the predetermined synchronization message according to the detected predetermined synchronization message, and configuring the synchronization information to an Ethernet port of a local device.

2. The method of claim 1, wherein, the starting detection of a predetermined synchronization message for a received Ethernet overhead frame in response to receiving a detection start instruction for the predetermined synchronization message comprises:
   in a case that the local device permits synchronization information configuration, starting detection of a predetermined synchronization message for a received Ethernet overhead frame in response to receiving a detection start instruction for the predetermined synchronization message.

3. The method of claim 1, wherein, before starting detection of a predetermined synchronization message for a received Ethernet overhead frame in response to receiving a detection start instruction for the predetermined synchronization message, the method further comprises:
   reading a value of a predetermined number of bits from the received Ethernet overhead frame; and
   determining the received detection start instruction according to the value of the predetermined number of bits.

4. The method of claim 1, wherein the predetermined synchronization message is a clock synchronization message, and the synchronization information comprises clock configuration information; and, the generating synchronization information corresponding to the predetermined synchronization message according to the detected predetermined synchronization message, and configuring the synchronization information to an Ethernet port of a local device comprises:
   in response to identifying a message type of a clock synchronization message from the received Ethernet overhead frame, acquiring the clock synchronization message in the Ethernet overhead frame; and in response to a physical address of a clock source device carried in the clock synchronization message is different from a physical address of the local device, generating clock configuration information according to the clock synchronization message, and configuring the clock configuration information to an Ethernet port of the local device.

5. The method of claim 4, wherein the generating clock configuration information according to the clock synchronization message, and configuring the clock configuration information to an Ethernet port of the local device comprises:

acquiring clock configuration information containing a clock quality level carried in the clock synchronization message;

detecting whether there is configured clock configuration information in the local device;

setting a priority of the generated clock configuration information according to a result of detection and the clock quality level; and configuring, according to the set priority of the clock configuration information, the generated clock configuration information to an Ethernet port of the local device.

6. The method of claim 5, wherein the setting a priority of the generated clock configuration information according to a result of detection and the clock quality level comprises:

in response to there being no configured clock configuration information, setting the priority of the generated clock configuration information according to the clock quality level; and in response to there being configured clock configuration information, setting the priority of the generated clock configuration information according to the clock quality level, and setting the priority of the generated clock configuration information to be lower than a priority of the configured clock configuration information.

7. The method of claim 1, wherein the predetermined synchronization message is a time synchronization message, and the synchronization information comprises time synchronization configuration information; and, the generating synchronization information corresponding to the predetermined synchronization message according to the detected predetermined synchronization message, and configuring the synchronization information to an Ethernet port of a local device comprises:

in response to identifying a message type of a time synchronization message from the Ethernet overhead frame, acquiring the detected time synchronization message;

successively acquiring each Ethernet port group of the local device, and generating time synchronization configuration information for ports in each Ethernet port group according to the detected time synchronization message; and configuring the time synchronization configuration information to the ports in each Ethernet port group.

8. The method of claim 7, wherein the generating time synchronization configuration information for ports in each Ethernet port group according to the detected time synchronization message comprises:

extracting time characteristic information from the time synchronization message, and comparing the extracted time characteristic information with time characteristic information of the Ethernet ports of the local device;

determining state of the ports in each Ethernet port group according to a result of comparison, the state of the ports being one of a master port and a slave port, with the master port being configured to issue a synchronization time and the slave port being configured to receive the synchronization time; and generating time synchronization configuration information for the ports in each Ethernet port group according to at least the state of the ports.

9. The method of claim 7, wherein the configuring the time synchronization configuration information to the ports in each Ethernet port group comprises:

detecting whether there is a port having configured time synchronization information in each Ethernet port group;

in response to there being no port having configured time synchronization information, successively configuring, in a port order and starting from a second port, the time synchronization configuration information to the ports in each Ethernet port group; and in response to there being a port having configured time synchronization configuration information, successively configuring, in the port order and starting from a predetermined port, the time synchronization configuration information to the ports in each Ethernet port group, the predetermined port being a port next to the port having configured time synchronization configuration information.

10. The method of claim 1, wherein the predetermined synchronization message comprises a clock synchronization message and a time synchronization message, and the synchronization information comprises clock configuration information and time synchronization configuration information; and, the generating synchronization information corresponding to the predetermined synchronization message according to the detected predetermined synchronization message, and configuring the synchronization information to an Ethernet port of a local device comprises:

in response to identifying a message type of a clock synchronization message and a message type of a time synchronization message from the received Ethernet overhead frame, acquiring the clock synchronization message and the time synchronization message in the Ethernet overhead frame;

in response to a physical address of a clock source device carried in the clock synchronization message is different from a physical address of the local device, generating clock configuration information according to the clock synchronization message, and configuring the clock configuration information to an Ethernet port of the local device; and in response to the physical address of the clock source device carried in the clock synchronization message is the same as the physical address of the local device, successively acquiring each Ethernet port group of the local device, generating time synchronization configuration information for ports in each Ethernet port group according to the detected time synchronization message, and configuring the time synchronization configuration information to the ports in each Ethernet port group.

11. The method of claim 1, further comprising:

in response to receiving a detection end instruction for a predetermined synchronization message, ending the detection of the predetermined synchronization message for the received Ethernet overhead frame;

in response to the local device having started the detection of the predetermined synchronization message, deleting the configured synchronization information corresponding to the predetermined synchronization message; and in response to the local device having manually configured synchronization information, reserving the manually configured synchronization information.

12. A network device, comprising a memory and a processor;

the memory is configured to store executable program codes; and the processor is configured to read the executable program codes stored in the memory to carry out a method for configuring synchronization information comprising:

starting detection of a predetermined synchronization message for a received Ethernet overhead frame in response to receiving a detection start instruction for the predetermined synchronization message, the detection start instruction comprising at least one of starting clock message detection and starting time message detection; and generating synchronization information corresponding to the predetermined synchronization message according to the detected predetermined synchronization message, and configuring the synchronization information to an Ethernet port of a local device.

13. The network device of claim 12, wherein, the starting detection of a predetermined synchronization message for a received Ethernet overhead frame in response to receiving a detection start instruction for the predetermined synchronization message comprises:

in a case that the local device permits synchronization information configuration, starting detection of a predetermined synchronization message for a received Ethernet overhead frame in response to receiving a detection start instruction for the predetermined synchronization message.

14. The network device of claim 12, wherein, before starting detection of a predetermined synchronization message for a received Ethernet overhead frame in response to receiving a detection start instruction for the predetermined synchronization message, the method further comprises:

reading a value of a predetermined number of bits from the received Ethernet overhead frame; and determining the received detection start instruction according to the value of the predetermined number of bits.

15. The network device of claim 12, wherein the predetermined synchronization message is a clock synchronization message, and the synchronization information comprises clock configuration information; and, the generating synchronization information corresponding to the predetermined synchronization message according to the detected predetermined synchronization message, and configuring the synchronization information to an Ethernet port of a local device comprises:

in response to identifying a message type of a clock synchronization message from the received Ethernet overhead frame, acquiring the clock synchronization message in the Ethernet overhead frame; and in response to a physical address of a clock source device carried in the clock synchronization message is different from a physical address of the local device, generating clock configuration information according to the clock synchronization message, and configuring the clock configuration information to an Ethernet port of the local device.

16. The network device of claim 15, wherein the generating clock configuration information according to the clock synchronization message, and configuring the clock configuration information to an Ethernet port of the local device comprises:

acquiring clock configuration information containing a clock quality level carried in the clock synchronization message;

detecting whether there is configured clock configuration information in the local device;

setting a priority of the generated clock configuration information according to a result of detection and the clock quality level; and configuring, according to the set priority of the clock configuration information, the generated clock configuration information to an Ethernet port of the local device.

17. A non-transitory computer-readable storage medium storing instructions which, when executed by a processor, causes the processor to carry out a method for configuring synchronization information comprising:

starting detection of a predetermined synchronization message for a received Ethernet overhead frame in response to receiving a detection start instruction for the predetermined synchronization message, the detection start instruction comprising at least one of starting clock message detection and starting time message detection; and generating synchronization information corresponding to the predetermined synchronization message according to the detected predetermined synchronization message, and configuring the synchronization information to an Ethernet port of a local device.

18. The non-transitory computer-readable storage medium of claim 17, wherein, the starting detection of a predetermined synchronization message for a received Ethernet overhead frame in response to receiving a detection start instruction for the predetermined synchronization message comprises:

in a case that the local device permits synchronization information configuration, starting detection of a predetermined synchronization message for a received Ethernet overhead frame in response to receiving a detection start instruction for the predetermined synchronization message.

19. The non-transitory computer-readable storage medium of claim 17, wherein, before starting detection of a predetermined synchronization message for a received Ethernet overhead frame in response to receiving a detection start instruction for the predetermined synchronization message, the method further comprises:

reading a value of a predetermined number of bits from the received Ethernet overhead frame; and determining the received detection start instruction according to the value of the predetermined number of bits.

20. The non-transitory computer-readable storage medium of claim 17, wherein the predetermined synchronization message is a clock synchronization message, and the synchronization information comprises clock configuration information; and, the generating synchronization information corresponding to the predetermined synchronization message according to the detected predetermined synchronization message, and configuring the synchronization information to an Ethernet port of a local device comprises:

in response to identifying a message type of a clock synchronization message from the received Ethernet overhead frame, acquiring the clock synchronization message in the Ethernet overhead frame; and in response to a physical address of a clock source device carried in the clock synchronization message is different from a physical address of the local device, generating clock configuration information according to the clock synchronization message, and configuring the clock configuration information to an Ethernet port of the local device.

* * * * *